UNITED STATES PATENT OFFICE.

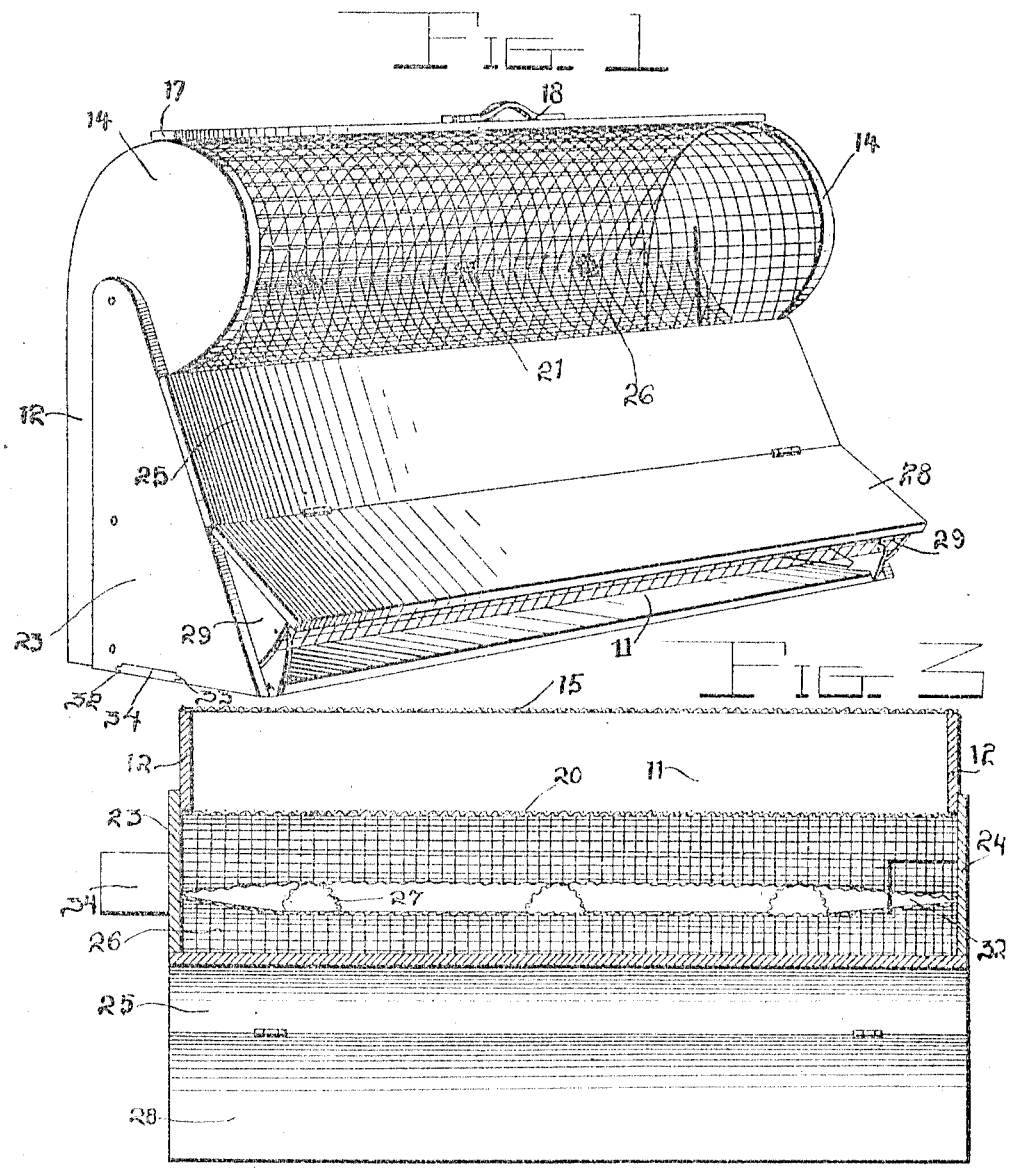

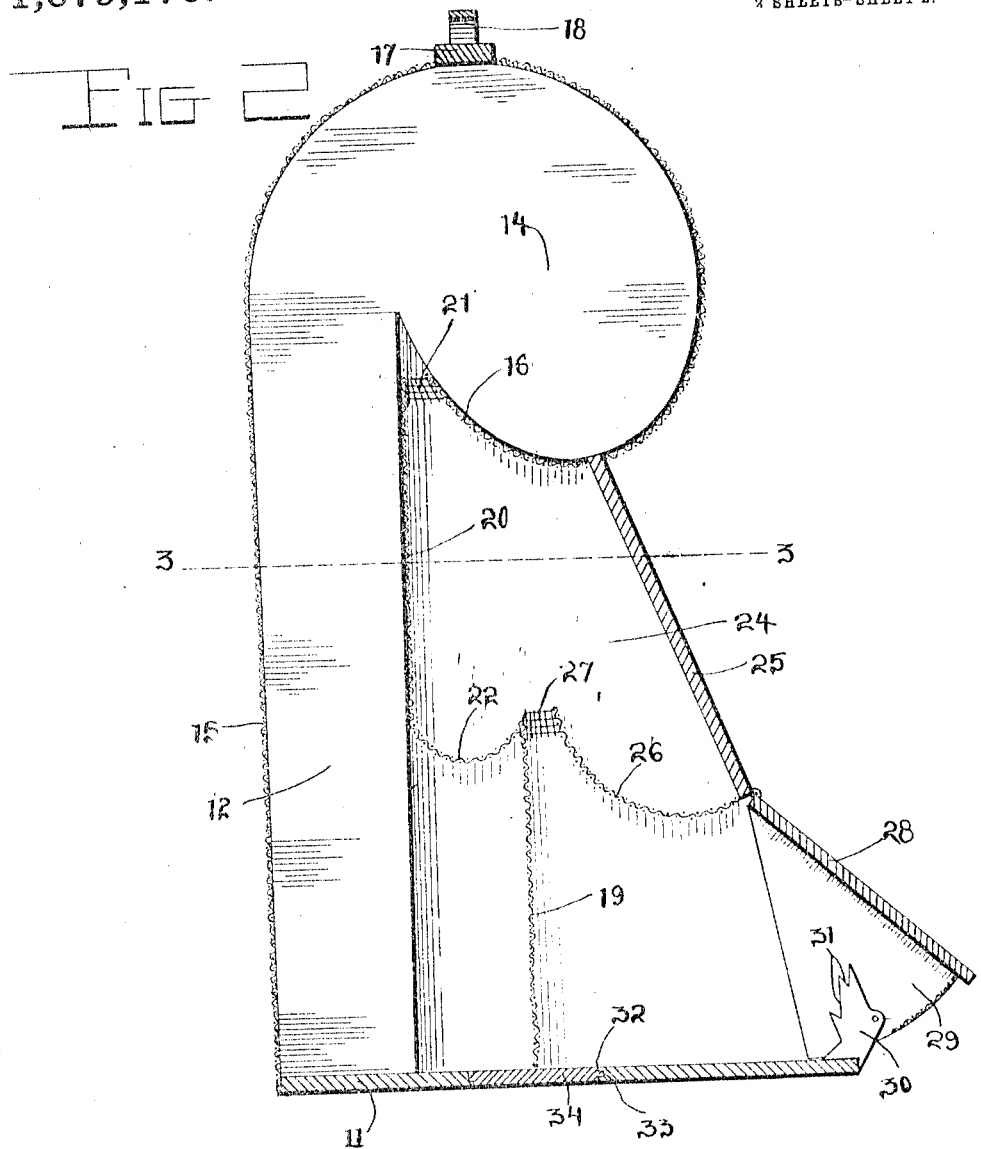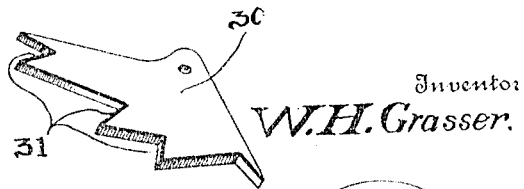

WILLIAM H. GRASSER, OF CLARKSTON, WASHINGTON.

INSECT-TRAP.

1,079,170.

Specification of Letters Patent. Patented Nov. 18, 1913.

Application filed October 4, 1911. Serial No. 652,711.

*To all whom it may concern:*

Be it known that I, WILLIAM H. GRASSER, a citizen of the United States, residing at Clarkston, in the county of Asotin, State of Washington, have invented certain new and useful Improvements in Insect-Traps; and I do hereby declare the following to be a full, clear, and exact description of the invention, such as will enable others skilled in the art to which it appertains to make and use the same.

My invention relates to new and useful improvements in insect traps and more especially to that class of traps particularly adapted to catch flies, and the object of my invention is to improve the construction and increase the efficiency of traps of the above described character.

A further object of my invention is to provide a trap having an entrance channel through which the flies pass and which communicates with the interior of the trap and having a second entrance channel communicating with an inner chamber formed within the trap. And a still further object of my invention is to provide a trap of the above described character having a slidable door in its base said door communicating both with the entrance chamber of the trap and the inner chamber thereof.

With these and other objects in view, my invention will be more fully described, illustrated in the accompanying drawings, which show a preferred embodiment of my device and then specifically pointed out in the claims which are attached to and form a part of this application.

In the accompanying drawings, Figure 1 is a perspective view of the trap. Fig. 2 is a vertical cross section thereof. Fig. 3 is a horizontal sectional view taken on the line 3—3 of Fig. 2, the sliding door being shown partly open. Fig. 4 is a detail perspective view of one of the closure holding members.

Referring more specifically to the drawings, in which similar reference numerals designate corresponding parts throughout, 11 designates the base of my trap which as shown is substantially rectangular in shape and is preferably formed of wood. Secured to the rear end portions of this base are upwardly extending side members 12 and 13 substantially rectangular in shape and terminating at their upper ends with laterally extending circular portions 14, these side members being also preferably formed of wood. The back wall of the trap here designated as 15 is formed of foraminous material, preferably wire screen, and as shown, this screen is extended upwardly over the circular portions 14 and then downwardly and around the same terminating in an upwardly directed portion as shown at 16, said screen being secured to the base and to the edge portions of the side members in any preferred manner. The upper ends of the sides 12 and 13 are connected to each other by a longitudinally extending brace bar 17 provided with a centrally located handle 18 by means of which the trap may be conveniently moved from place to place.

Secured to the lower portion of the sides 23 and 24 and extending longitudinally between the same is a strip of wire screening 19 while another strip of screening 20 is secured by its edges to the inner faces of the side walls with its upper edge extending in parallel spaced relation to the free edge of the curved portion 16 of the screen 15, said edges being maintained in slightly spaced relation by means of braces 21. These edges are however brought together at the sides of the trap to prevent the insects from crawling along the sides and through the opening between the edges. The lower end of the screen 20 extends below the upper end of the screen 19 and is then bent upwardly and forwardly and its free edge is secured to the upper edge of the screen 19 thus forming a loop portion 22.

Secured to the base and to the forward portion of the outer faces of the side members 12 and 13 are the forward side members 23 and 24 each of which as shown is triangular in shape and extending longitudinally between these members and secured to their forward edges is a front wall member 25 the upper edge of which bears against the rolled portion 16 of the screen 15 and the lower edge of which is spaced a considerable distance above the base of the trap. Secured to the lower edge of this wall 25 and to the inner faces of the side members 23 and 24 is a screen 26, which screen curves inwardly and upwardly with its free edge terminating in parallel spaced relation to the joined edges of the screens 19 and 20, it being held in such position by braces 27. These edges are also brought together at the sides of the trap. Hinged to the lower edge of the wall 25 is a closure 28 which in closed position bears against the forward edges of the sides 23 and 24 and rests upon the forward edge of the base 11. As shown the ends of this closure are provided with inwardly directed wings 29 by means of which escape from the trap from the sides thereof is prevented when the closure is in normal or open position. A strip of netting 28' connects these wings and is secured along its outer edge to the lower edge of the closure 28, this strip serving to prevent the escape of insects which have once entered the trap. Pivotally mounted upon one of these wings is a supporting member 30 which is provided with a plurality of seats 31 adapted to engage against the forward edge of the base 11 whereby the closure may be supported in adjusted spaced relation therefrom.

The base 11 as best shown in Fig. 3 of the drawings is provided with a longitudinally extending slot 32 the side edges of which are channeled as at 33 to receive a sliding door 34 and this door opening is so positioned as to lie partially in front of the partition screen 19 and partially to the rear thereof, the purpose of this positioning being to permit the removal of flies from both the outer and inner chambers of the trap.

In operation the closure of the trap is raised a sufficient distance to admit the flies to pass readily into the trap beneath the same and as the forward wall of the trap is preferably constructed of wood the flies are attracted by the light from the rear of the trap and instead of passing out they pass upwardly between the edge of the screen 15 and hence into the inner chamber of the trap from which escape is practically impossible.

As will be readily seen this is an extremely simple form of trap and at the same time very effective.

It will of course be understood that the trap may be constructed entirely of sheet metal and screening if desired, instead of being formed partially of wood as shown and described, or that the trap may be made in various sizes or that minor improvements in construction may be made without the slightest degree departing from the spirit of the invention.

What I claim is:

1. A fly trap comprising a bottom portion, end head members provided with downward offset extensions engaging the bottom, a pair of end members secured outwardly of the head portions and the extensions, a front plate secured to the end members adjacent the head portions, a door hinged to said plate, a foraminous rear wall, said wall being extended and secured to the edges of the head portion to form a top and a partial front wall, said member being further extended inwardly of the front plate, and a foraminous partition wall having its ends attached to the inner edges of the downward extension and having its upper extremity spaced from the free extremity of the further extension of the foraminous wall.

2. In a fly trap, the combination of a bottom portion, side portions, a front plate secured to the side portions and spaced from the bottom portions, a door hinged to the plate, inwardly directed wings attached to the end of the door, the lower ends of said wings engaging the bottom portions and a strip of foraminous material secured to the door and to the wings.

In testimony whereof, I affix my signature, in presence of two witnesses.

WILLIAM H. GRASSER.

Witnesses:
WM. A. HALL,
SUE M. HALL.